United States Patent
Kuboshima et al.

Patent Number: 5,399,103
Date of Patent: Mar. 21, 1995

[54] CONNECTOR DEVICE FOR CONNECTING BATTERIES

[75] Inventors: Hidehiko Kuboshima; Shigemi Hashizawa; Shigemitsu Inaba, all of Shizuoka, Japan

[73] Assignee: Yazaki Corporation, Tokyo, Japan

[21] Appl. No.: 194,829

[22] Filed: Feb. 14, 1994

[30] Foreign Application Priority Data

Feb. 18, 1993 [JP] Japan .................. 5-029133

[51] Int. Cl.6 .................................. H01R 31/08
[52] U.S. Cl. .......................... 439/509; 439/504
[58] Field of Search ............ 439/509, 511, 504; 200/333, 502

[56] References Cited

U.S. PATENT DOCUMENTS 4,740,178  4/1926  Badenhorst et al. ............... 439/142
5,321,203  6/1994  Goto et al. ........................ 439/511

FOREIGN PATENT DOCUMENTS 54-85316  6/1979  Japan .
54-86621  6/1979  Japan .
60-178978 11/1985  Japan .
1-170967 12/1989  Japan .

Primary Examiner—Gary F. Paumen
Attorney, Agent, or Firm—Heslin & Rothenberg

[57] ABSTRACT

A connector device for electrically connecting batteries of electric vehicles and the like comprising a pair of single-pole connectors in which each electrical contacting portion of a wire terminal has an insertion hole for a contact finger of a mating terminal so that the insertion hole is located substantially perpendicular to the axis of the wire terminal, and in which the wire terminal and the electrical contacting portion are mounted in an insulating housing, a connector case body for incorporating the pair of the single-pole connectors and a case cover which can be engaged with the connector case body, provided with a short-circuit terminal having a pair of contact fingers which can be electrically connected to the electrical contacting portion of the terminal. This facilitates connecting batteries and secures the safety.

12 Claims, 3 Drawing Sheets

CONNECTOR DEVICE FOR CONNECTING BATTERIES

BACKGROUND OF THE INVENTION

1. Field of the Invention

The present invention relates to a connector device for electrically connecting a plurality of batteries used in, for example, electric vehicles.

2. Description of Related Art

Japanese Utility Model Laid-Open No. 54-86621 has disclosed a metallic connecting member having clamps at both ends, each of which have two split pieces for gripping a battery post of a battery by tightening a bolt. The connecting member are covered with a covering member.

According to the prior art methods for connecting batteries, the battery posts and the connecting members are connected to each other by means of bolts. Thus ease of maintenance is not so high and, further, there is a danger that users may directly touch the battery post or the connecting member.

SUMMARY OF THE INVENTION

An object of the present invention is to provide a connector device for electrically connecting batteries which secures ease of handling, safety and excellent maintainability.

According to the present invention, there is provided a connector device for electrically connecting batteries comprising: a pair of single-pole connectors each of which has an insertion hole for receiving a contact finger of a mating terminal, the insertion hole being formed in an electrical contacting portion provided at the front end of a wire terminal provided on a wire suitable for connecting to a battery post of a battery so that the insertion hole is located substantially perpendicular to the axis of the wire terminal, the wire terminal and the electrical contacting portion being mounted in an insulating housing comprising a cylindrical portion accommodating the wire terminal and a raised collar which is substantially perpendicular to the cylindrical portion, the raised collar surrounding the insertion hole for receiving the contact finger; a connector case body for accommodating the pair of single-pole connectors substantially in parallel to each other; and a case cover which may be engaged with the connector case body and further may be locked thereto, the case cover including a pair of the contact fingers which are inserted into the insertion holes so as to be electrically connected to the electrical contacting portions when the connector case body is closed by the case cover, the pair of contact fingers being electrically connected to each other by means of a short-circuit terminal.

In the connector device for connecting batteries according to the present invention, the wire terminal provided on an end of wire connected to the battery post is incorporated in the insulating housing to form a single-pole connector, the safety can be secured because a worker is free from the danger of touching a bare high-voltage power line. When connecting different batteries to each other, the pair of single-pole connectors are set in the connector case body and then the case cover is closed. Then, it is possible to obtain conductivity between the wire terminals of the pair of single-pole connectors by means of the pair of contact fingers which are connected to a short-circuit terminal in the case cover, thereby securing ease of use and safety. When removing the power line from the battery, the case cover is opened. Then, the high-voltage circuit is cut off securing the safety of the procedure. Additionally, because the wire terminal mounted within the connector case is substantially perpendicular to the direction of the insertion of the contact fingers in the case cover, the wire terminal does not become loose even if the wire terminal receives a force along the length of the wire.

The objects, advantages and novel features of the present invention will be described in details with reference to the accompanying drawings.

DESCRIPTION OF THE PREFERRED EMBODIMENTS

Figure 1:
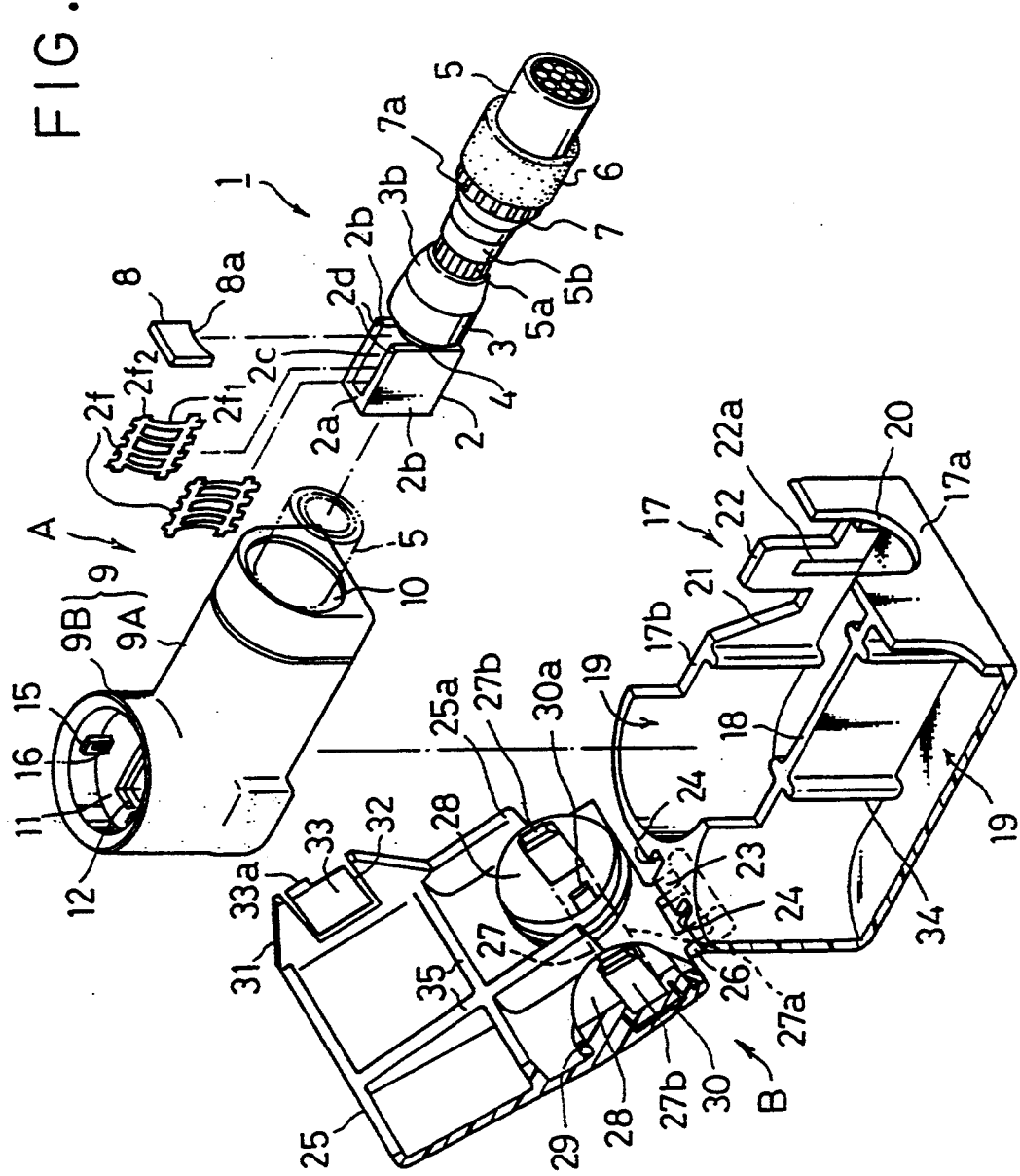
FIG. 1 is a perspective view showing an embodiment of the connector device for connecting batteries according to the present invention in a disassembled state.
Figure 2:
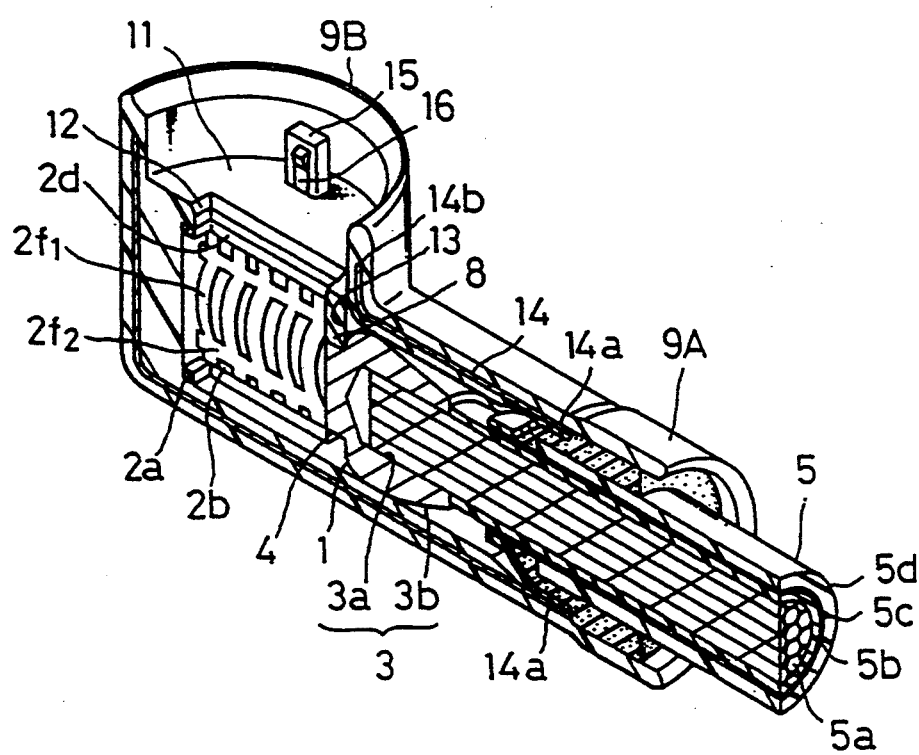
FIG. 2 is a perspective view of the longitudinal section of the single-pole connector shown in FIG. 1.
Figure 3:
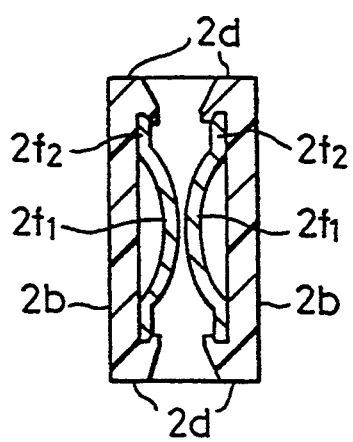
FIG. 3 is a cross sectional view of the electrical contacting portion of a wire terminal shown in FIG. 1.
Figure 4:
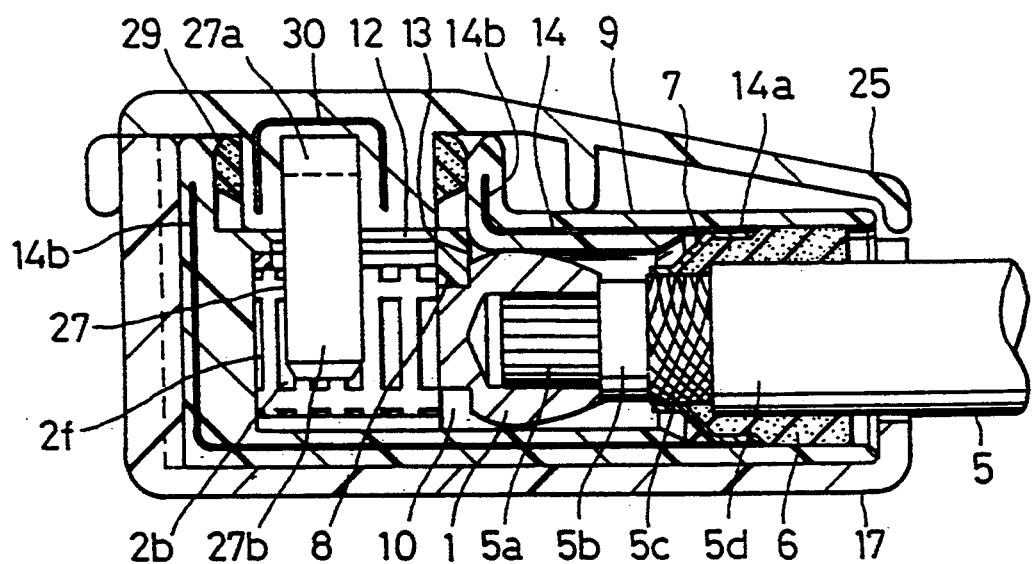
FIG. 4 is a longitudinally sectional view of the connector device in FIG. 1 in an assembled state.

Referring to FIGS. 1–3, a single-pole connector A comprises a wire terminal 1 which secures a distal end of a shield wire 5 and an insulating housing 9. A pair of the single-pole connectors A are contained in a connector case B. The connector case B comprises a case body 17 and a case cover 25, one end of which is rotatably connected to the case body 17.

The wire terminal 1 comprises a forward electrical contacting portion 2 and a rearward wire connecting portion 3 both of which are connected through a narrow neck portion 4. The electrical contacting portion 2 includes a contact finger receiving portion 2c which is a slit comprising a front wall 2a and a pair of side walls 2b which extend backward from both ends of the front wall 2a, the slit being open upward and downward. Preferably, in the contact finger receiving portion 2c, protrusions 2d are provided on the upper and lower edges of both side walls 2b so as to contain spring tines 2f between the protrusions 2d thereby making the electrical contacting portion 2 into contact with a mating contact finger securely. Although, in the figures, the spring tines 2f are constructed so that a plurality of arc spring pieces 2f1 are connected by means of upper and lower connecting pieces 2f2 in the shape of grids, it is permissible to construct the spring tine 2f of a single sheet. On the other hand, the wire connecting portion 3 is a cylindrical member incorporating core wires insertion hole 3a and a taper 3b is formed at the circumference of the rear end of that cylindrical member so that the diameter of the taper 3b decreases as it extends to the rear end.

The aforementioned wire terminal 1 is a so-called L type female terminal in which the axis of the shield wire 5 is perpendicular to the connecting direction of the contact finger of a corresponding terminal and is made by machining a solid well-conductive metal, for example, a round copper bar. The wire terminal 1 is produced so that the upper and lower edges of the side walls 2b of the electrical contacting portion 2 are substantially flush with the circumference of the wire connecting portion 3.

One end of the shield wire 5 is connected to a battery post (not shown) and an exposed core wires 5a of the other end thereof is inserted into the core wires insertion hole 3a and press-fit to the wire connecting portion 3 by crimping. Reference numeral 5b designates an internal covering layer, numeral 5c designates a stranded shield wire and numeral 5d designates an external covering layer. A waterproof rubber plug 6 is fit to the end of the portion in which the external covering layer 5d is removed so that it straddles the external covering layer 5d the shield wire 5c. A metallic connecting member 7 is mounted in front of the waterproof rubber plug 6 so that it contacts the shield wire 5c. Preferably, as shown in the figure, a plurality of gathers 7a are formed on the rear edge of the connecting member 7 by cutting. The stopper 8 is used for locking the wire terminal 1 within the insulating housing 9. The bottom edge of the stopper 8 has an arched portion 8a which corresponds to the neck portion 4 of the wire terminal 1.

The insulating housing 9 comprises a housing main body 9A in which a wire terminal incorporating hole 10 is provided and a cylindrical short-circuit terminal connecting portion or a raised collar 9B which is formed to connect with the front end of the housing main body 9A.

The raised collar 9B is separated from the wire terminal incorporating hole 10 by means of a raised bottom 11 which includes a contact finger insertion hole 12 and an insertion hole 13 for the stopper 8.

An elbow shaped shielding metallic shell 14 is integrated in the insulating housing 9 by molding so that the shell is buried substantially in the inside wall of the insulating housing 9 except that one end 14a of the metallic shell 14 is exposed on the internal surface of the rear end in the wire terminal incorporating hole 10. The other end 14b of the metallic shell 14 extends in the wall of the raised collar 9B. Shielding metallic contact tags 16 which are supported by reinforcing pieces 15 are provided on the raised bottom 11 of the raised collar 9B with the contact finger insertion hole 12 interposed therebetween. The contact tag 16 is conductive to the aforementioned metallic shell 14 by means of a connecting piece (not shown) which is buried in the raised bottom 11.

The box type case body 17 of the connector case B includes two connector storing sections 19 formed by a partition wall 18 which correspond to respective single-pole connectors A. The rear wall 17a of the case body 17 has outlets 20 for introducing the shield wires 5 of the connectors contained in respective connector storing sections 19. A locking wall 22 having a vertical long hole 22a which is interposed between the front and rear cutouts 21 is formed behind the side wall 17b. A supporting piece 23 above which a hinge is constructed in the center thereof is formed on the front wall of the case body 17 with concavities 24 provided on both sides of the supporting piece 23.

One end of the case cover 25 has a pair of ear pieces 26 which constructs the hinge together with the aforementioned supporting piece 23. The case cover 25 is rotatably mounted on the case body 17 so that the case 25 is capable of opening and closing with respect to the case body 17 by engaging small hemispherical protrusions (not shown) provided on both ends of the supporting piece 23 with concavities (not shown) provided on corresponding faces of the ear pieces 26.

A U-shaped short-circuit terminal 27 has contact fingers 27b which are provided on both ends of a bus bar 27a. The bus bar 27a is embedded in the case cover 25 so that the contact fingers 27b protrude from the back of the case cover 25 through a cylindrical plug section 28. A waterproof rubber member 29 is fit to the base of the plug section 28. A channel-like shielding metallic shell 30 is embedded in the case cover 25 together with the short-circuit terminal 27 as if the metallic shell 30 covers the short-circuit terminal 27. Connecting pieces 30a which correspond to a pair of the contact tags 16 in the raised collar 9B are connected to the metallic shell 30 and the connecting pieces 30a are erected from the end face of the plug section 28 with the contact finger 27b interposed therebetween.

Both side walls 25a of the case cover 25 have a reverse trapezoid shaped protecting wall 31 which fills the front and rear cutouts 21 of the connector case body 17. The protecting wall 31 has a flexible locking piece 33 having a locking protrusion 33a, along which two slits are provided. Reinforcing ribs 34, 35 are provided on the case body 17 and the case cover 25 respectively.

Next, the method for connecting two batteries by means of the aforementioned connector will be described below.

As shown in FIGS. 1 and 2, the wire terminal 1 is press-fit to one end of the shield wire 5 and then the connecting member 7 and the waterproof rubber plug 6 are mounted thereon. The wire terminal 1 is inserted into the wire terminal incorporating hole 10 of the insulating housing 9 to seal the wire terminal incorporating hole 10 by means of the waterproof rubber plug 6. Consequently, the gather 7a of the connecting member 7 which contacts the shield wire 5c is brought into contact with the overall inner circumference of one end 14a of the metallic shell 14 by means of the elastic force of the waterproof rubber plug 6. In the raised collar 9B of the insulating housing 9, the stopper 8 is pressed in through the insertion hole 13. As a result, the arched portion 8a of the stopper 8 is locked in the neck portion 4 between the electrical contacting portion 2 and the wire connecting portion 3 preventing the wire terminal 1 from retracting.

In the manner described above, the single-pole connector A is assembled in which the shield wire 5 is brought into contact with the metallic shell 14 within the insulating housing 9 and the rear end of the wire terminal incorporating hole 10 is sealed.

Next, the other ends of a pair of shield wires 5 assembled in the single-pole connectors A are connected to respective battery posts of batteries according to known ways.

Finally, the pair of single-pole connectors A are accommodated in each connector storing section 19 of the case body 17 in the connector case B and then the case cover 25 is closed.

Accordingly, a pair of the contact fingers 27b of the short-circuit terminal 27 which is buried in the case cover 25 are inserted through the contact finger insertion hole 12 so that the contact fingers 27b are inserted into the electrical contacting portion 2, that is, the contact finger receiving portion 2c which is provided between the facing side walls 2b, thereby making it possible to electrically connect two batteries. At the same time, the connecting pieces 30a of the metallic shell 30 which is buried in the case cover 25 are brought into contact with the contact tags 16 supported by the reinforcing pieces 15 so as to become conductive with the metallic shell 14 within the insulating housing 9, thereby a pair of the wire terminal 1 being electromagnetically shielded completely. Further, the raised collars 9B of the pair of single-pole connectors A are sealed by means of the plug sections 28 and the waterproof rubber members 29 in order to seal the wire terminal 1.

In the case cover 25, the protecting walls 31 of both side walls 25a fill the cutouts 21 of the case body 17 and the locking protrusions 33a of the flexible locking pieces 33 lock in the vertical long holes 22a on the locking walls 22, thereby the case cover 25 being locked in the case body 17.

When the connector device according to the present invention is used, if the single-pole connector A is preliminarily connected to an end of the shield wire 5 which is to be connected to the battery post, workers are not subject to contacting bare power lines, making it possible to facilitate connecting and disconnecting batteries and maintenance thereof.

If, as described before, the spring pieces 2f are fit in the contact finger receiving portion 2c, the electrical contacting portion 2 is brought into firm contact with the contact finger by means of elastic force of the spring piece 2f and further it is possible to secure a large clearance between the contact finger 27b and the contact finger receiving portion 2c, facilitating manufacture of the wire terminal 1.

Although, according to the embodiment described above, the case cover 25 is rotatably mounted on the case body 17 of the connector case B by means of a hinge, it is permissible to separate both components. Also it is permissible to employ a means of tightening by screws instead of the locking means (locking wall 22, flexible locking piece 33). Further, it is permissible to use ordinary wire terminal in which the terminal axis is the same as the connecting directing of a corresponding terminal, although the aforementioned wire terminal 1 is formed as a L type female terminal. Thus according to the present invention, it is also permissible to modify the wire terminal 1 and the contact finger 27b of the short-circuit terminal 27 to be male and female types respectively.

If electromagnetic-shield processing is .not required, it is possible to omit the metallic shells 14, 30 and the sealing member such as the connecting member 7 to use the connector device according to the present invention as an ordinary wire connector device.

What is claimed is:

1. A connector device for connecting batteries comprising: a pair of single-pole connectors each of which has an insertion hole for receiving a contact finger of a mating terminal, the insertion hole being formed in an electrical contacting portion provided at the front end of a wire terminal provided on a wire suitable for connecting to a battery post of a battery so that said insertion hole is located substantially perpendicular to the axis of the wire terminal, .said wire terminal and said electrical contacting portion being mounted in an insulating housing which comprises a cylindrical portion accommodating said wire terminal and a raised collar which is substantially perpendicular to said cylindrical portion, said raised collar surrounding said insertion hole for receiving the contact finger; a connector case body for accommodating the pair of single-pole connectors substantially in parallel to each other; and a case cover which may be engaged with said connector case body and further may be locked thereto, said case cover including a pair of said contact fingers which are inserted into said insertion holes so as to be electrically connected to said electrical contacting portions when said connector case body is closed by said case cover, said pair of contact fingers being electrically connected to each other by means of a short-circuit terminal.

2. The connector device for connecting batteries according to claim 1 wherein said wire terminal is formed into a cylinder made of a solid highly conductive metal so as to have an opening at one end, a wire being inserted into said opening and fixed by crimping.

3. The connector device for connecting batteries according to claim 2 wherein said insulating housing includes a metallic shell which is provided therein by molding said insulating housing integrally therewith for electromagnetic-shielding, the ends of said metallic shell being electrically connected to contact tags exposed within said raised collar.

4. The connector device for connecting batteries according to claim 3 wherein said case cover includes cylindrical plugs which are provided at positions corresponding to said respective raised collars of the single-pole connectors, each said cylindrical plug being able to be engaged with a raised bottom of a respective said raised collar, said cylindrical plugs further containing said pair of contact fingers.

5. The connector device for connecting batteries according to claim 4 wherein an electromagnetic-shielding metallic shell, the ends of which are exposed along the circumference of said plug, is buried in a pair of said plugs of said case cover.

6. The connector device for connecting batteries according to claim 5 wherein said pair of contact fingers are short-circuited by means of a bus bar which is provided by molding said case cover integrally therewith.

7. The connector device for connecting batteries according to claim 6 wherein annular waterproof members are mounted on the circumferences of respective said plugs of said case cover.

8. The connector device for connecting batteries according to claim 7 wherein a plurality of facing spring tines which are electrically connected to said wire terminals are provided in the insertion holes for said contact fingers.

9. The connector device for connecting batteries according to claim 8 wherein said wire terminals are each formed by machining a round copper bar.

10. The connector device for connecting batteries according to claim 9 wherein said connector case body has a partition wall for separating a said pair of single-pole connectors.

11. The connector device for connecting batteries according to claim 10 wherein said case cover is connected to said connector case body through a hinge provided on a wall near the portion in which said electrical contacting portions are located, so that said case cover can be opened and closed.

12. The connector device for connecting batteries according to claim 1 wherein said connector case body and said case cover are separated but can be locked together when they are engaged with each other.

* * * * *